(12) United States Patent
Beier et al.

(10) Patent No.: US 10,317,627 B2
(45) Date of Patent: Jun. 11, 2019

(54) OPTICAL ADAPTOR FOR MOUNTING TO A RECEPTACLE TO OPTICALLY COUPLE CONNECTORIZED OPTICAL CABLES

(71) Applicant: CCS Technology, Inc., Wilmington, DE (US)

(72) Inventors: Joachim Rudolf Beier, Munich (DE); Wolf Peter Kluwe, Hagen (DE); Jürgen Matthies, Wetter (Ruhr) (DE); Gordon Mueller-Schlomka, Berlin (DE); Martin Schulte, Wildau (DE); Michael Wimmer, Berlin (DE)

(73) Assignee: Corning Optical Communications, LLC, Hickory, NC (US)

( * ) Notice: Subject to any disclaimer, the term of this patent is extended or adjusted under 35 U.S.C. 154(b) by 0 days.

(21) Appl. No.: 15/591,687

(22) Filed: May 10, 2017

(65) Prior Publication Data

US 2017/0242200 A1  Aug. 24, 2017

Related U.S. Application Data

(63) Continuation of application No. PCT/US2015/059430, filed on Nov. 6, 2015.

(30) Foreign Application Priority Data

Nov. 14, 2014  (EP) ..................................... 14193298

(51) Int. Cl.
*G02B 6/38* (2006.01)

(52) U.S. Cl.
CPC .......... *G02B 6/3825* (2013.01); *G02B 6/3831* (2013.01); *G02B 6/3869* (2013.01); *G02B 6/3897* (2013.01)

(58) Field of Classification Search
CPC ... G02B 6/3825; G02B 6/3831; G02B 6/3869
(Continued)

(56) References Cited

U.S. PATENT DOCUMENTS

| 5,274,729 A | 12/1993 | King et al. |
| 5,297,227 A | 3/1994 | Brown et al. |

(Continued)

FOREIGN PATENT DOCUMENTS

| CN | 102868447 A | 1/2013 |
| EP | 0967497 A1 | 12/1999 |

(Continued)

OTHER PUBLICATIONS

Patent Cooperation Treaty, International Search Report and Written Opinion for PCT/US15/47869, dated Jan. 5, 2016, 11 pages.

(Continued)

*Primary Examiner* — Robert Tavlykaev
(74) *Attorney, Agent, or Firm* — Michael E. Carroll, Jr.

(57) ABSTRACT

An optical adaptor for mounting to a receptacle to optically couple connectorized optical cables comprises a coupling element to provide a passageway for inserting a respective ferrule of a first and a second optical connector terminating a first and a second optical cable. The optical adaptor further comprises a mounting element to mount the first optical connector to the receptacle, the mounting element being configured to be insertable in the receptacle, and a fixing element to fix the mounting element to the receptacle. The mounting element is formed as a hollow body to receive the coupling element and configured to fix the coupling element to the receptacle.

20 Claims, 13 Drawing Sheets

(58) Field of Classification Search
USPC .................................. 385/55, 56, 58, 60
See application file for complete search history.

(56) References Cited

U.S. PATENT DOCUMENTS

| | | | |
|---|---|---|---|
| 5,537,501 | A | 7/1996 | Iwano et al. |
| 6,102,581 | A | 8/2000 | Deveau et al. |
| 6,149,315 | A | 11/2000 | Stephenson |
| 6,341,191 | B1 | 1/2002 | Takahashi |
| 6,487,344 | B1* | 11/2002 | Naudin ............... G02B 6/4471 385/100 |
| 6,579,014 | B2* | 6/2003 | Melton ............... G02B 6/3825 385/55 |
| 6,648,520 | B2 | 11/2003 | McDonald et al. |
| 6,802,653 | B2 | 10/2004 | Deane |
| 7,419,313 | B2* | 9/2008 | Jablonski ............ H01R 13/746 385/92 |
| 7,614,797 | B2* | 11/2009 | Lu ...................... G02B 6/3894 385/53 |
| 7,686,519 | B2* | 3/2010 | Lu ...................... G02B 6/3825 385/56 |
| 8,184,939 | B2* | 5/2012 | Parikh ................ G02B 6/4477 385/135 |
| 8,480,310 | B2 | 7/2013 | Kewitsch |
| 8,864,389 | B2 | 10/2014 | Lin |
| 9,720,198 | B2* | 8/2017 | Kuffel ................ G02B 6/4471 |
| 9,915,789 | B2* | 3/2018 | Beier .................. G02B 6/3825 |
| 10,025,038 | B2* | 7/2018 | Mueller-Schlomka ............... G02B 6/3894 |
| 2003/0095779 | A1 | 5/2003 | Chang |
| 2006/0088248 | A1 | 4/2006 | Tran et al. |
| 2009/0003772 | A1* | 1/2009 | Lu ...................... G02B 6/3825 385/60 |
| 2009/0282214 | A1 | 11/2009 | Kuesel et al. |
| 2012/0263419 | A1 | 10/2012 | Briggs et al. |
| 2014/0044394 | A1 | 2/2014 | Lin |
| 2014/0133804 | A1 | 5/2014 | Lu et al. |
| 2016/0139343 | A1 | 5/2016 | Dean, Jr. et al. |
| 2018/0259721 | A1* | 9/2018 | Bund .................. G02B 6/3825 |

FOREIGN PATENT DOCUMENTS

| | | |
|---|---|---|
| JP | 2006258861 A | 9/2006 |
| JP | 2009103837 A | 5/2009 |
| WO | 2015197588 A1 | 12/2015 |

OTHER PUBLICATIONS

Patent Cooperation Treaty, International Search Report and Written Opinion for PCT/US2015/047868, dated Jan. 7, 2016, 11 pages.
Patent Cooperation Treaty, International Search Report and Written Opinion for PCT/US2015/047872, dated Dec. 21, 2015, 10 pages.
Patent Cooperation Treaty, International Search Report and Written Opinion for PCT/US2015/059430, dated Jun. 1, 2016, 15 pages.
Commscope, "Hardened Drop Cable and Connector Solultions," http://www.commscope.com/Docs/Hardened-Drop-Cable-and-Connector-Solutions-311638BE.pdf, 4 pages.

* cited by examiner

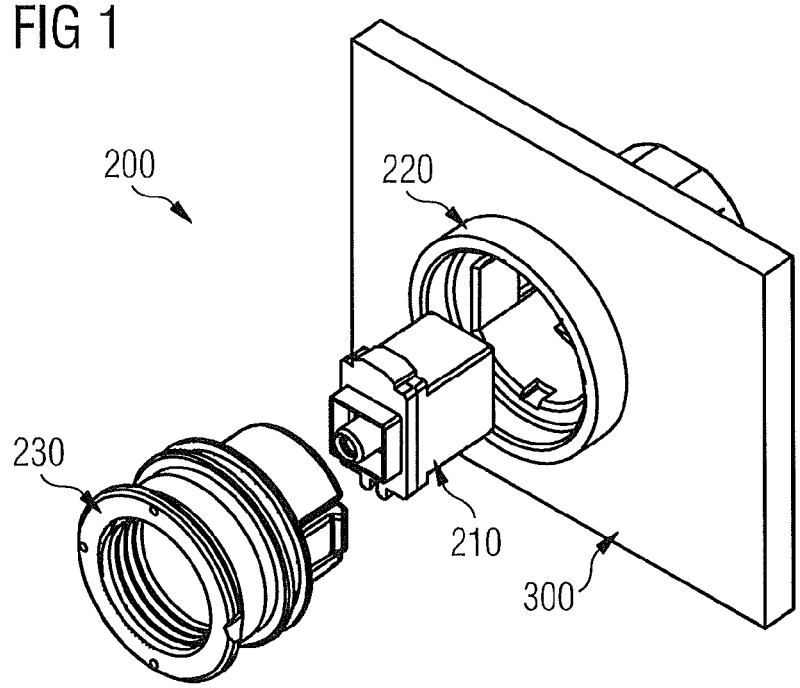
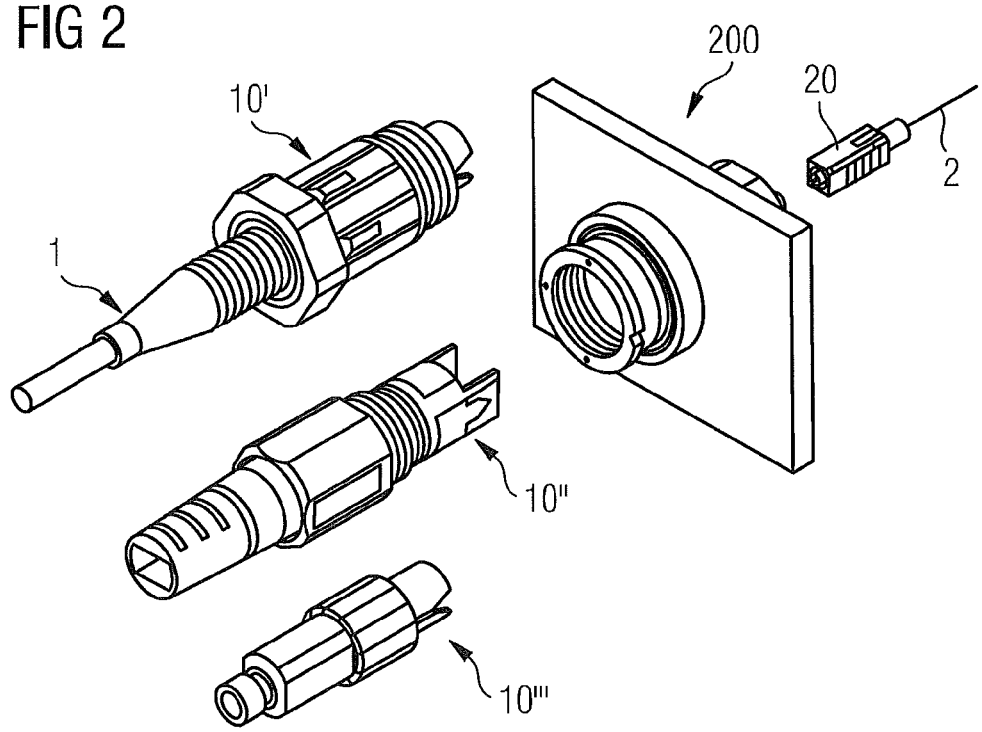

OPTICAL ADAPTOR FOR MOUNTING TO A RECEPTACLE TO OPTICALLY COUPLE CONNECTORIZED OPTICAL CABLES

PRIORITY APPLICATION

This application is a continuation of International Patent Application Serial No. PCT/US15/59430, filed on Nov. 6, 2015, which claims the benefit of priority under 35 U.S.C. § 119 of European Patent Application Serial No. 14193298.8, filed on Nov. 14, 2014, the contents of which are relied upon and incorporated herein by reference in their entireties.

FIELD

The present invention relates to an optical adaptor for mounting to a receptacle to optically couple connectorized cables. Connectorized cables include, for example, cables with connectors installed on them in the field, and cables with connectors installed on them in the factory being preconnectorized optical cables. Such connectorized optical cables respectively comprise at least one optical fiber which is to optically connect to each other. The invention further relates to an optical assembly to optically couple connectorized cables, for example, preconnectorized optical cables to each other.

BACKGROUND

Optical cables, such as fiber optic drop cables, are capable of transmitting an extremely large amount of bandwidth compared with copper cables. The development in communication networks tends to bring optical cables closer to subscribers to have access to the increased bandwidth. However, there are certain obstacles that make it challenging and/or expensive to route optical cables deeper into the communication network, i.e. closer to a subscriber.

For instance, making a suitable optical connection between optical waveguides is much more difficult than making an electrical connection between copper wires. This is because optical connections require special tools and equipment, highly trained craftsmen, along with precision components. Additionally, as the communication network pushes towards subscribers, the communication network requires more connections, which compounds the difficulties of providing optical waveguides to the premises of the subscriber.

In order to couple generic cables having a simple structure, for example copper cables, the ends of the cables may be terminated by suitable pairs of connectors such as complementarily shaped connectors. In order to ensure the coupling of light between fiber optic cables with low attenuation, the ends of the optical fibers to be coupled have to be precisely aligned.

A precise alignment of optical fibers to be connected to each other may be ensured by using a receptacle/an optical port being adjusted to receive the optical connectors respectively terminating each of the optical cables in order to guarantee a precise coupling of the optical fibers included in the optical cables. In order to couple a first and a second cable with connectors on them, for example, preconnectorized optical cables, a first optical connector terminating the first optical cable may be inserted in the receptacle at a first side of the receptacle, and a second optical connector terminating the second optical cable may be inserted in the receptacle at a second side of the receptacle.

The receptacle provides at least a mounting function for the optical connectors terminating the optical cables. Besides the mechanical coupling function, the receptacle may also provide an optical coupling function for optical coupling the optical fibers of the optical cables. In order to provide the mechanical and optical coupling function the receptacle may comprise a coupling element. The coupling element is usually configured to receive the first optical connector at a first side of the coupling element and to receive the second connector at a second side of the coupling element.

The receptacle is usually adapted to the type of optical connectors to be coupled. A receptacle may, for example, be designed by a manufacturer to couple the first optical connector of a first type to the second optical connector of the same type or a second different type. The first optical connector may be a connector made by the same manufacturer which also produces the receptacle. The second optical connector may be a connector of an industrial standard. Several industrial standard connector types are available such as SC connector, ST connector and LC connector.

The precise coupling of connectorized cables such as preconnectorized optical cables will be challenging, if one of the optical connectors has to be replaced by an optical connector of another type and a subscriber do not wish to substitute the already pre-installed receptacle. Assuming that the exchanged first optical connector is an optical connector being produced by another manufacturer than the manufacturer of the primarily installed receptacle, the new first optical connector will not be compatible with the existing receptacle. If the exchanged optical connector has a different size and/or shape than the previously installed first optical connector which was used thitherto with the receptacle, the newly used first optical connector may often not even be inserted in the receptacle let alone optically coupled to the second optical connector. In this case, it is necessary to use an optical adaptor as an intermediate part between the new first optical connector, the receptacle and the second optical connector.

There is a need to provide an optical adaptor being mountable to a receptacle to optically couple connectorized cables which allows a precise alignment of the optical fibers of the connectorized optical cables. There is also a desire to provide an optical assembly to optically couple connectorized cables to ensure a precise alignment of the optical fibers of the connectorized optical cables.

SUMMARY

An embodiment of an optical adaptor for mounting to a receptacle to optically couple connectorized optical cables is specified in present claim 1.

According to an embodiment of the optical adaptor for mounting to a receptacle to optically couple connectorized optical cables, the optical adaptor comprises a coupling element to provide a passageway for inserting a ferrule of a first optical connector to terminate a first one of the connectorized optical cables and a ferrule of a second optical connector to terminate a second one of the connectorized optical cables to optically couple the first and the second connectorized optical cable. The coupling element is configured to be insertable in the receptacle. The optical adaptor comprises a mounting element to mount the first optical connector to the receptacle. The mounting element is configured to be insertable in the receptacle. The optical adaptor further comprises a fixing element to fix the mounting element to the receptacle.

The mounting element is formed as a hollow body to receive the coupling element and configured to fix the coupling element to the receptacle, when the coupling element is inserted in the receptacle and the mounting element is fixed to the receptacle. The mounting element is configured to mechanically couple the first optical connector to the mounting element so that the ferrule of the first optical connector intrudes in the passageway of the coupling element at a first side of the coupling element. The coupling element has a second side to insert the second optical connector into the coupling element to mechanically couple the second optical connector to the coupling element such that the ferrule of the second optical connector intrudes in the passageway of the coupling element.

An embodiment of an optical assembly to optically couple connectorized optical cables is specified in present claim 11.

According to an embodiment of the optical assembly, the optical assembly comprises an optical adaptor for mounting to a receptacle to optically couple connectorized optical cables as the optical adaptor is specified above. The receptacle comprises a fixture to fix the receptacle in a hole of a housing and to insert the coupling element of the optical adaptor. The receptacle comprises a fixation adaptor being configured to be fixed to the fixture and being formed as a hollow body to insert the mounting element and to fix the fixing element of the optical adaptor.

BRIEF DESCRIPTION OF THE DRAWINGS

FIG. 1 is a perspective view of a receptacle to couple connectorized optical cables such as preconnectorized optical cables;

FIG. 2 shows first optical connectors of a different type to be connected to a second optical connector by a receptacle;

DETAILED DESCRIPTION

Figure 3:
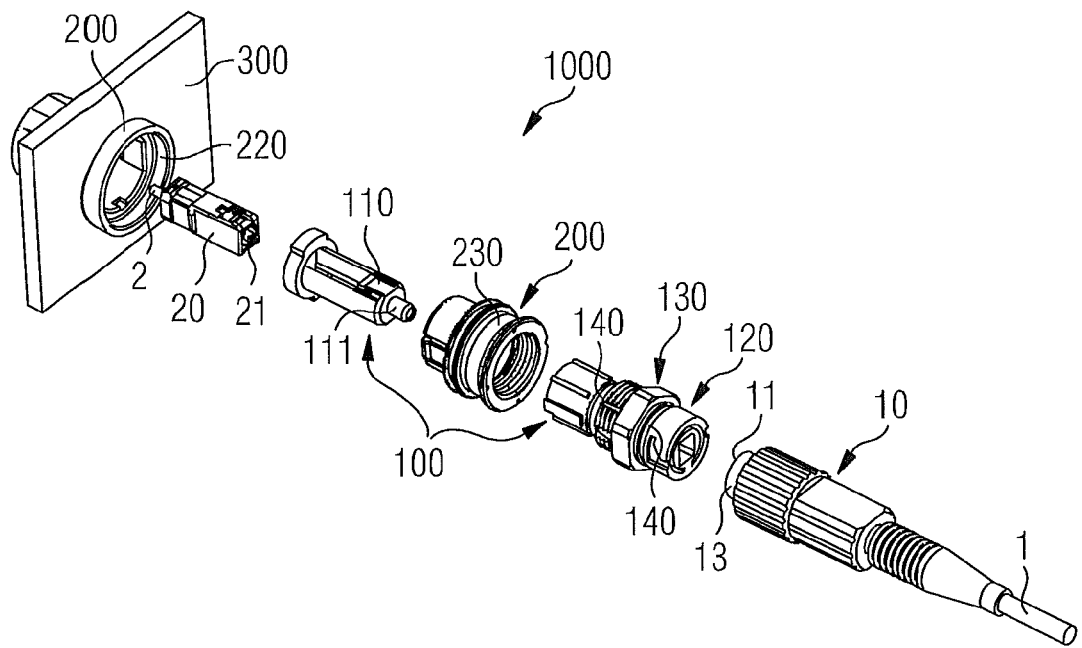
FIG. 3 shows an exploded view of an optical assembly to optically couple connectorized optical cables.

The present invention will now be described in more detail hereinafter with reference to the accompanying drawings showing different embodiments of the invention. The invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention.

FIG. 1 shows an embodiment of a receptacle 200 comprising a coupling element 210 to which an optical connector terminating an optical cable, for example a fiber optic drop cable, may be connected. The receptacle 200 comprises a fixture 220 arranged in a bore hole of a housing such as a housing of a distribution closure. The receptacle 200 comprises a fixation adaptor 230 which may be mounted to the fixture 220 by inserting the fixation adaptor 230 into the fixture 220. The fixation adaptor 230 may comprise snap hooks to engage the fixation adaptor 230 to the fixture 220 and to securely hold the fixation adaptor 230 inside the fixture 220. The coupling element 210 may be inserted and securely held in the fixation adaptor 230. The coupling element 210 is configured to connect a first optical connector terminating a first optical cable to a second optical connector terminating a second optical cable. The coupling element 210 is further configured to optically couple an optical fiber of the first optical cable to an optical fiber of the second optical cable.

FIG. 2 shows connectorized optical cables such as a preconnectorized optical cable 1, for example a fiber optic drop cable, which is terminated at its end by an optical connector 10' of a first type. FIG. 2 shows other optical connectors 10" and 10'" being of a different second and third type. Another optical cable 2 is terminated at its end by optical connector 20 being of a fourth type. The optical connector 20 may be configured as a connector of a SC industrial standard type. The receptacle 200 comprises the coupling element 210, the fixture 220 and the fixation adaptor 230 as illustrated in FIG. 1. Several industrial standard connector types are available such as SC connector, ST connector or LC connector. These connectors are connected to the optical fiber to align it relative to a ferrule provided within the assembly. The front face of the connector is used to align the optical fiber. In the detailed embodiment, the assembly is described using an SC connector. Other connectors such as ST or LC connector may be used instead of an SC connector what requires adaption to the particular front face of the connector and the changes required are apparent to a skilled artisan. Cable 1 may be a cable with a connector installed on it. The connector may be installed in the factory being a preconnectorized optical cable. This disclosure and the described embodiments contemplate also connectorized cables with connectors installed on them in the field.

The receptacle 200 is configured to optically couple the preconnectorized optical cable 1 being terminated with the optical connector 10' to the preconnectorized optical cable 2 being terminated with the optical connector 20. In particular, the optical connector 10' may be connected to the coupling element 210 at the front side of the coupling element, and the optical connector 20 may be fixed to the coupling element 210 at a rear side of the coupling element such that the optical fibers of the optical cable 1 and 2 are aligned to each other so that an optical attenuation of light coupled between the preconnectorized optical cables 1 and 2 is reduced.

Due to the required precise alignment of the optical fibers of the optical cables to be coupled to each other the receptacle 200 and particularly the coupling element 210, the fixture 220 and the fixation adaptor 230 of the receptacle are usually adapted to couple specific types of optical connectors to each other. The receptacle 200 may be designed to couple the optical connector 10' of the first type to the optical connector 20 of the fourth type. However, the receptacle 200 is not configured to couple the optical connector 20 with one of the other optical connectors 10", 10'" being of the second and third type.

In order to avoid a complete exchange of the receptacle 200 for coupling one of the optical connectors 10" and 10'" to the optical connector 20, an optical adaptor has to be arranged between the receptacle 200 and the respective optical connector 10", 10'" as an intermediate component to couple one of the optical connectors 10", 10'" to the optical connector 20 or to couple one of the optical connectors 10", 10'" to a first side of the optical adaptor and to couple the existing coupling element 210 of the receptacle 200 to a second side of the optical adaptor.

Figure 15:
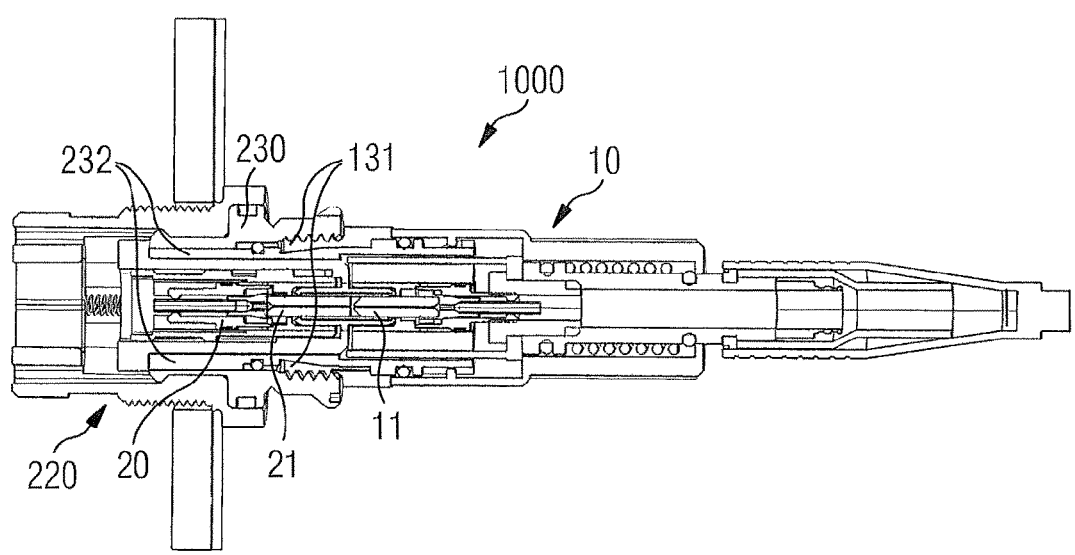
FIG. 15 shows a cross-sectional view of optical connectors coupled by an optical assembly.

FIG. 3 shows an exploded view of an arrangement of an optical assembly 1000 to couple connectorized optical cables 1 and 2, wherein the optical cable 1 is connected to an optical connector 10 and the optical cable 2 is connected to an optical connector 20. The optical connector 10 terminates the optical cable 1 so that the optical cable 1 is configured as a connectorized optical cable, and the optical connector 20 may terminate the optical cable 2 so that the optical cable 2 is also configured as a connectorized optical cable. A respective ferrule 11 and 21 of the optical connectors 10 and 20 encapsulates a respective optical fiber of the optical cables 1 and 2. The ferrule 11 of the optical connector 10 being better shown in FIG. 15 is surrounded by a shroud 13 of the optical connector 10. The design of the front face of the optical connector 20 shown in the Figures is typical for an SC type connector. However, other front face designs are available for ST or LC type connectors, respectively.

The optical assembly comprises an optical adaptor 100 comprising a coupling element 110, a mounting element 120, a fixing element 130 and a sealing element 140. The coupling element 110 is configured to provide a passageway 111 for inserting the ferrule 11 of the optical connector 10 and the ferrule 21 of the optical connector 20 to optically couple the connectorized optical cables 1 and 2. The coupling element 110 is configured to be insertable in the receptacle 200.

The optical assembly 1000 further comprises a receptacle 200 to mount the optical adaptor 100. The receptacle 200 comprises a fixture 220 and a fixation adaptor 230. The fixture 220 is configured to insert the coupling element 110 of the optical adaptor 100 and to fix the receptacle 200 in a hole of a housing 300, such as a housing of a distribution closure. The fixation adaptor 230 is configured to be fixed to the fixture 220 and being formed as a hollow body to insert the mounting element 120 and to fix the fixing element 130.

The mounting element 120 is configured to mount the optical connector 10 to the receptacle 200 and is further configured to be insertable in the receptacle 200. The fixing element 130 is configured to fix the mounting element 120 to the receptacle 200, i.e. to the fixation adaptor 230 of the receptacle.

Figure 4A:
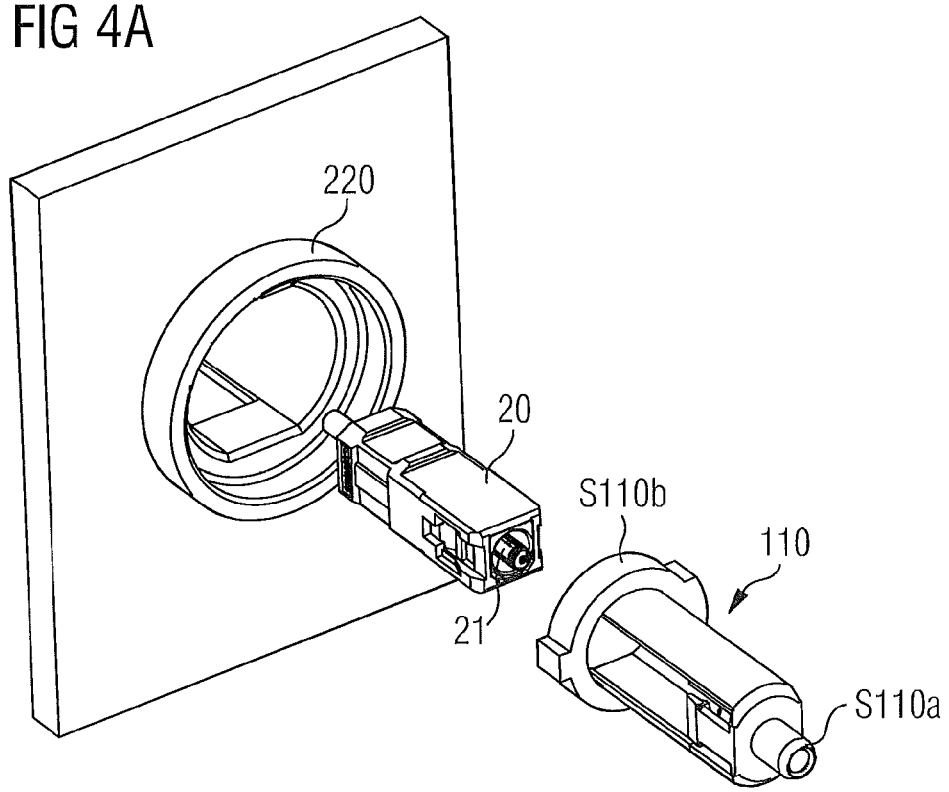
FIG. 4A shows a perspective view of a coupling element of an optical adaptor, a receptacle and an optical connector in unmated configuration.
Figure 4B:
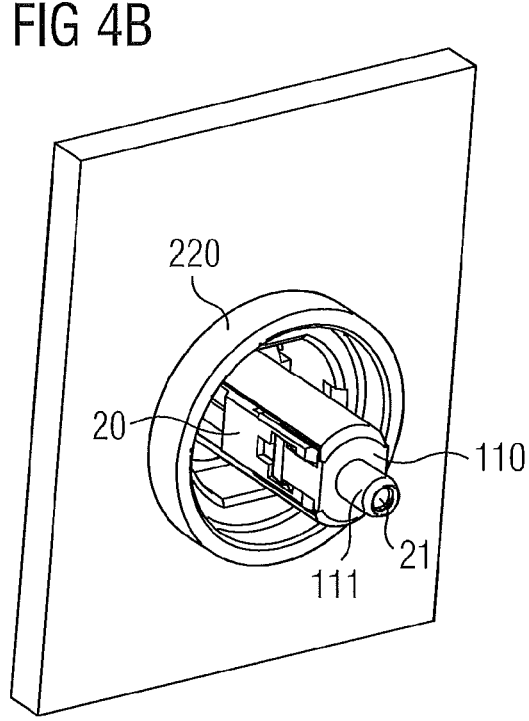
FIG. 4B shows a perspective view of a coupling element of an optical adaptor, a receptacle and an optical connector in an assembled configuration.

FIG. 4A shows the optical connector 20 terminating the optical cable 2, the coupling element 110 and the fixture 220 of the receptacle 200 in an unmated configuration. The coupling element 110 has a side S110b to insert the optical connector 20 into the coupling element 110 to mechanically couple the optical connector 20 to the coupling element 110. FIG. 4B shows the optical connector 20 which is inserted in a hollow body of the coupling element 110. In the mated configuration of the optical connector 20 and the coupling element 110, the ferrule 21 of the optical connector 20 intrudes in the passageway 111 of the coupling element 110.

Figure 5A:
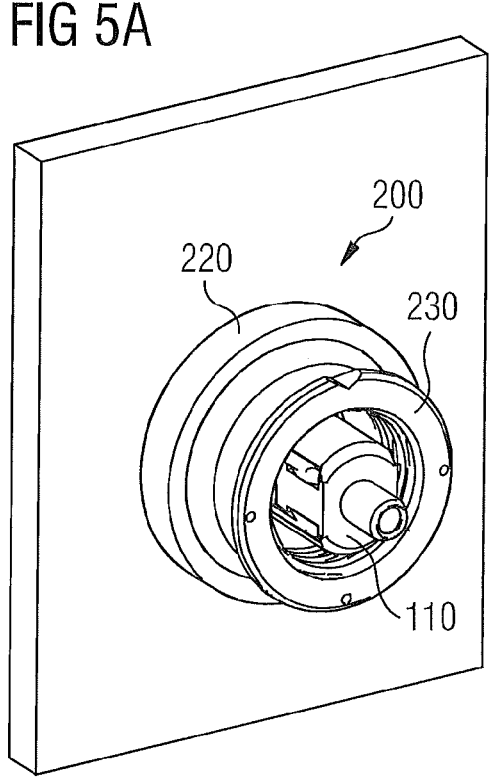
FIG. 5A shows a perspective view of a coupling element of an optical adaptor and an optical connector in a mated configuration mounted to a receptacle with a fixture and a fixation adaptor.
Figure 5B:
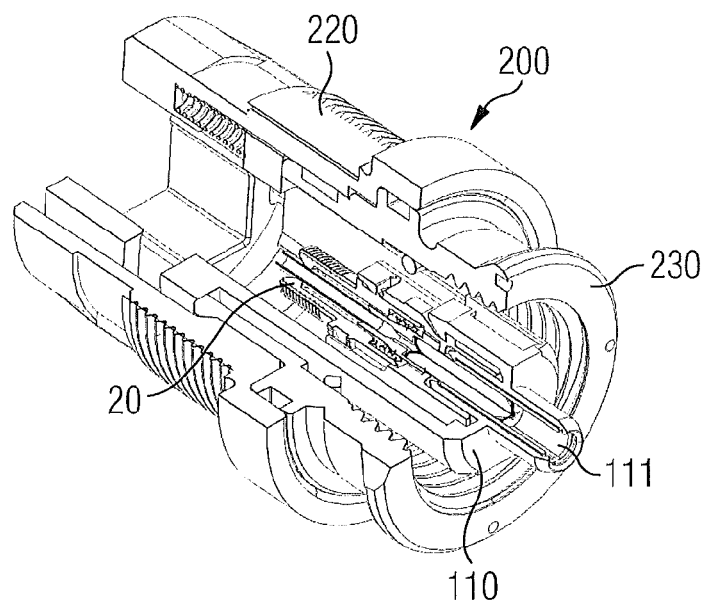
FIG. 5B shows a perspective sectional view of a coupling element of an optical adaptor and an optical connector in a mated configuration mounted to a receptacle with a fixture and a fixation adaptor.

After having inserted the coupling element 110 with the optical connector 20 arranged therein in the fixture 220, the fixation adaptor 230 is inserted in the fixture 220 and mechanically coupled to the fixture 220. FIG. 5A shows a perspective view of the receptacle 200 comprising the fixture 220 and the fixation adaptor 230 inserted and fixed to the fixture 220. The coupling element 110 with the optical connector 20 connected to the coupling element 110 is placed in the receptacle 200. FIG. 5B shows a perspective sectional view of the receptacle 200 comprising the fixture 220 and the fixation adaptor 230, wherein the coupling element 110 with the inserted connector 20 is mounted to the receptacle 200. The coupling element 110 is adjusted by the fixation adaptor 230.

Figure 6A:
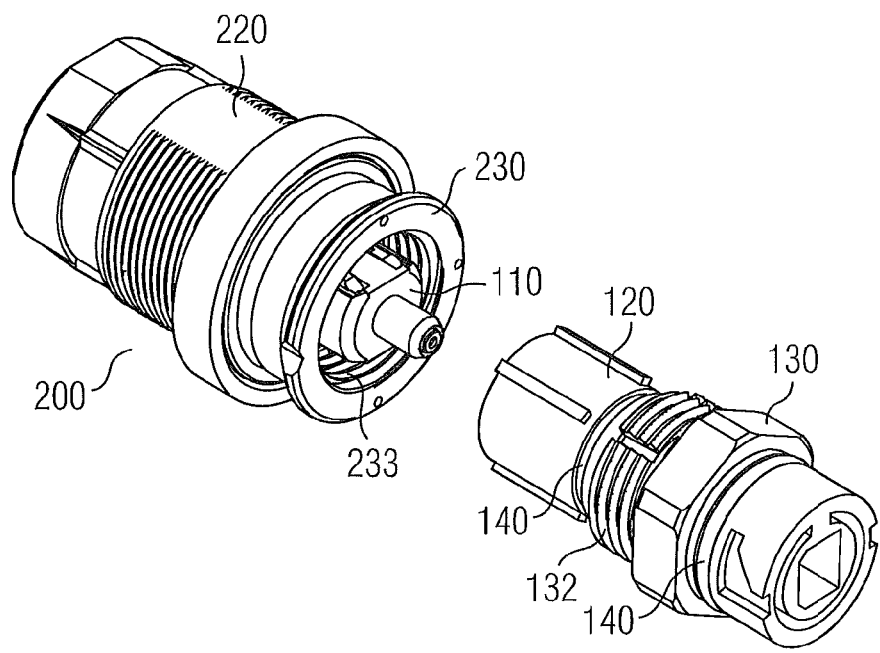
FIG. 6A shows a perspective view of a mounting element and a fixing element of an optical adaptor and a receptacle with a coupling element of the optical adaptor in an unmated configuration.

FIG. 6A shows the receptacle 200 comprising the fixture 220 and the fixation adaptor 230 in the assembled configuration of FIG. 5A. The coupling element 110 is inserted in the receptacle 200. FIG. 6A further shows the mounting element 120 with the fixing element 130 and the sealing element 140. The optical assembly 1000 may be assembled by inserting the mounting element 120 into the respective hollow body of the fixture 220 and the fixation adaptor 230. After having inserted the mounting element 120 into the receptacle 200 the connection between the mounting element 120 and the fixation adaptor 230 is fixed by the fixing element 130

According to a possible embodiment the fixing element 130 may be formed as a screw which is arranged in a rotatable manner on the outer surface of the mounting element 120. The screw may have an external thread 132. An inner thread 233 of the fixation adaptor 230 and the outer thread 132 of the screw 130 enable that the screw 130 may be screwed to the fixation adaptor 230 to fix the mounting element 120 to the fixture 220.

Figure 6B:
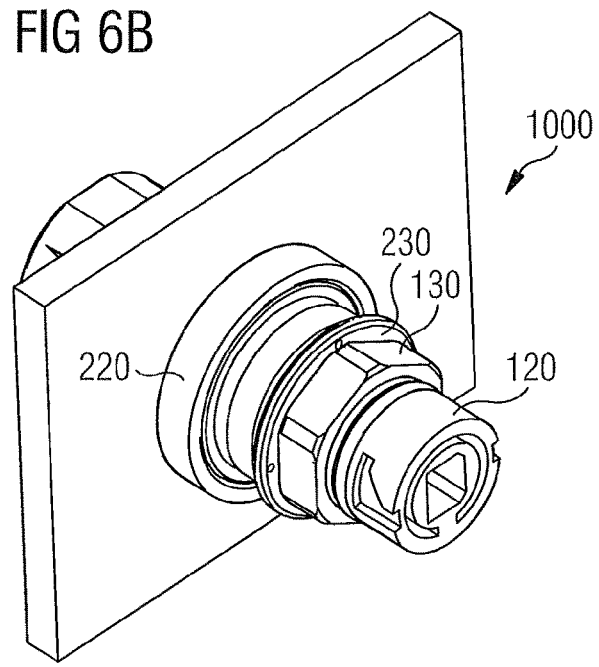
FIG. 6B shows a mounting element, a fixing element and a receptacle in an assembled configuration.

FIG. 6B shows the optical assembly 1000 to optically couple connectorized optical cables 1 and 2 in a mated condition. The optical assembly 1000 comprises the receptacle 200 and the optical adaptor 100. The mounting element 120 and the fixing element 130 of the optical adaptor 100 project out of the receptacle 200. The mounting element 120 is formed as a hollow body to receive the coupling element 110. The mounting element 120 is configured to fix the fixation adaptor 230 to the fixture 220 and is further configured to fix the coupling element 110 to the receptacle 200. The fixation adaptor 230 and the mounting element 120 prevent that the coupling element 110 falls out of the receptacle. The coupling element 110 is securely held inside the fixture 220 by the fixation adaptor 230 and the mounting element 120.

Figure 7A:
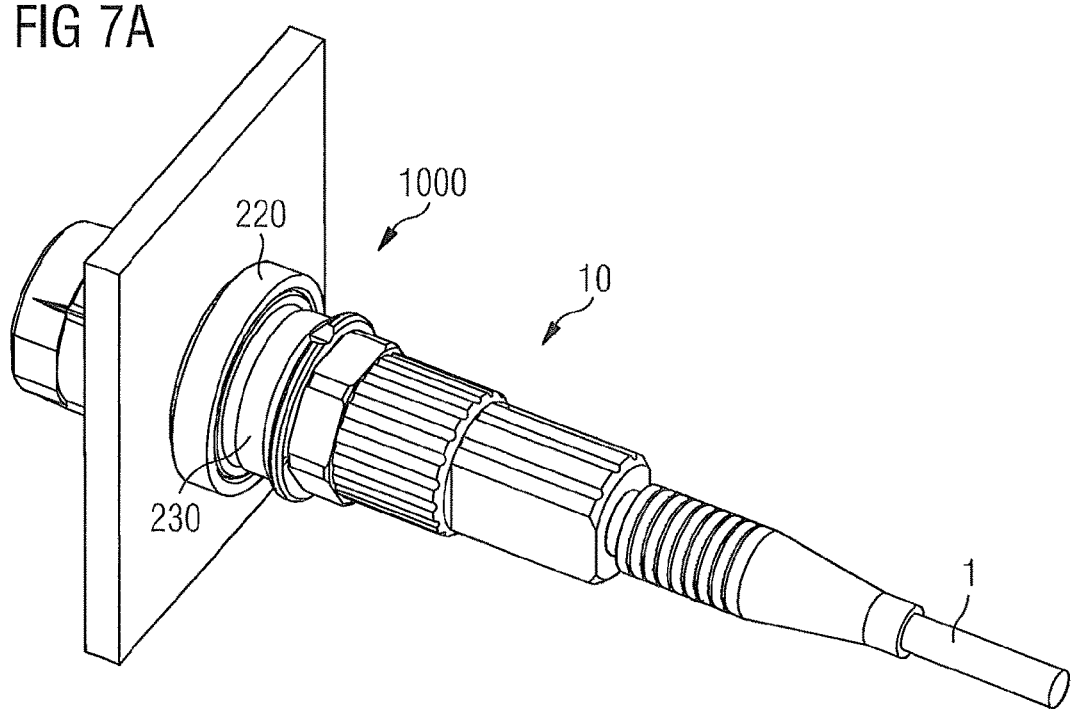
FIG. 7A shows a perspective view of an optical connector mechanically coupled to a receptacle.
Figure 7B:
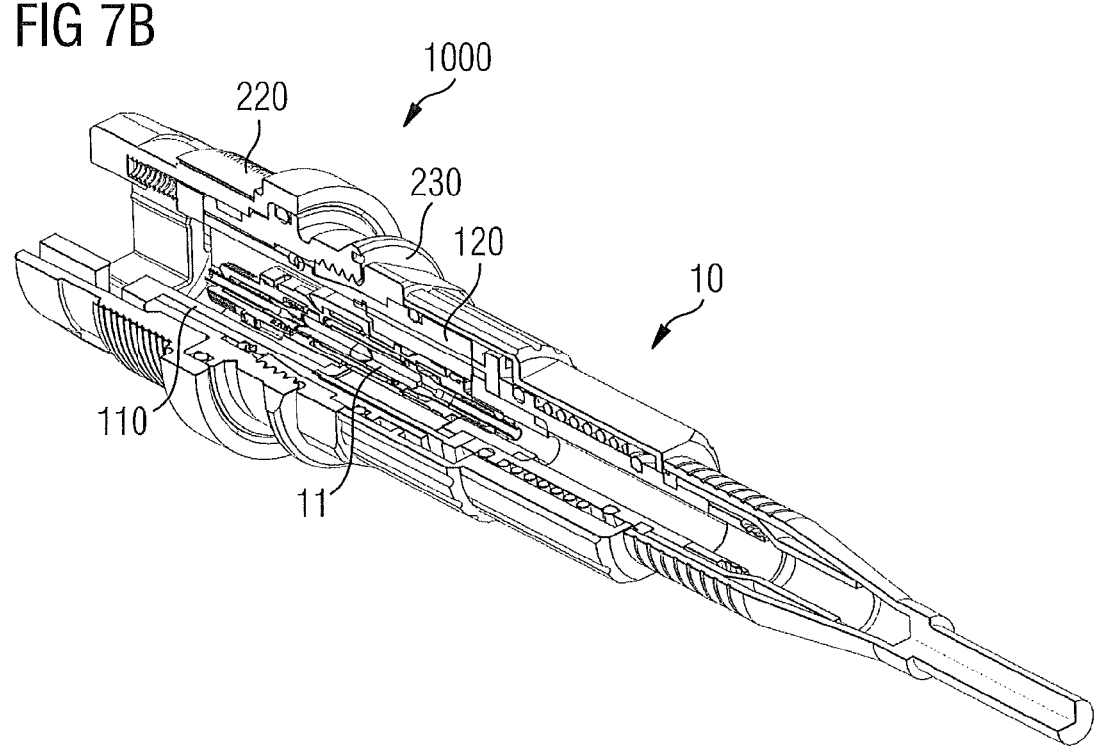
FIG. 7B shows a perspective sectional view of an optical connector and a receptacle to connect connectorized optical cables.

FIG. 7A shows a perspective view of the optical connector 10 terminating the optical cable 1, wherein the optical connector 10 is mechanically coupled to the optical assembly 1000. FIG. 7B shows a perspective sectional view of the assembled configuration of the optical connector 10 coupled to the optical assembly 1000. The mounting element 120 is configured to mechanically couple the optical connector 10 to the mounting element 120. In the assembled configuration, the ferrule 11 of the optical connector 10 intrudes in the passageway 111 of the coupling element 110. The coupling element 110 is configured so that the respective ferrule of the optical connector 10 and the optical connector 20 are optically coupled to each other in the passageway 111 to transfer light between the optical cables 1 and 2.

Figure 8A:
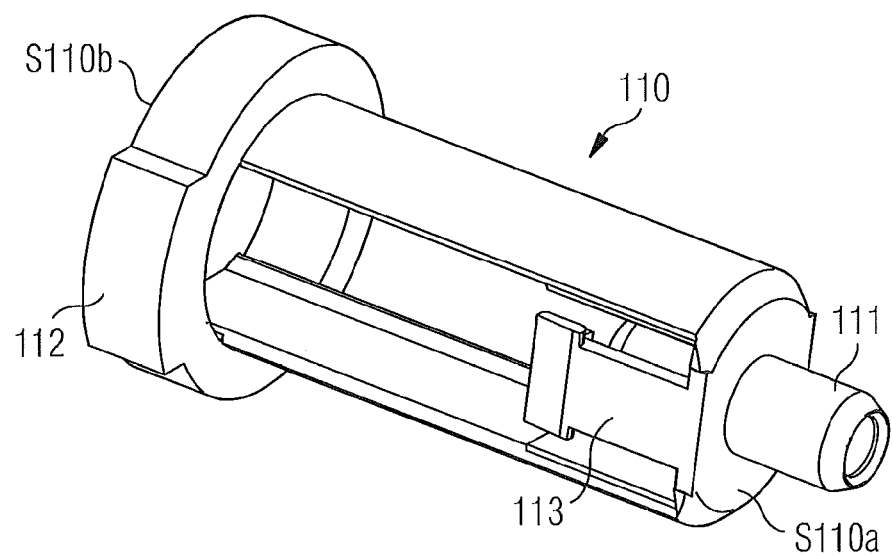
FIG. 8A shows a perspective view of a coupling element of an optical adaptor to couple connectorized optical cables.

FIG. 8A shows a perspective view of the coupling element 110 to receive the optical connector 20. The coupling element is formed as a hollow body having a side S110b to insert the optical connector 20 into the hollow body of the coupling element 110. The coupling element 110 comprises the passageway 111. The passageway 111 is formed as a tube being arranged at a side S110a of the coupling element 110. The coupling element 110 further comprises an alignment element 112 to direct the insertion of the coupling element 110 into the receptacle 200. The coupling element further comprises an engagement element 113 to engage the optical connector 20 to the coupling element 110.

Figure 8B:
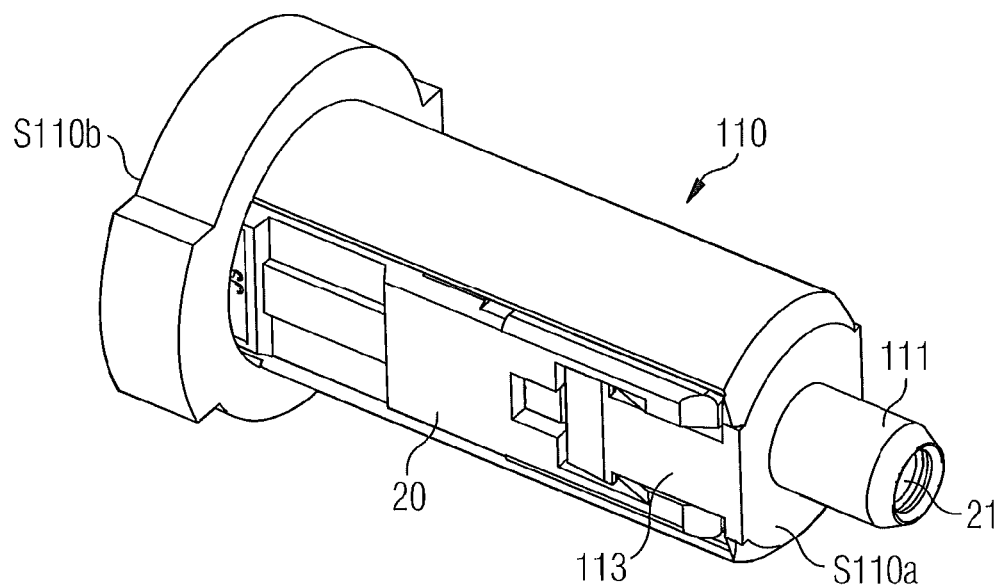
FIG. 8B shows a perspective view of a coupling element of an optical adaptor and an optical connector in a mated configuration.

FIG. 8B shows the coupling element 110, wherein the optical connector 20 is inserted in the hollow body of the coupling element 110 from the side S110b of the coupling element. The coupling element 110 is provided with a complementarily-shaped engagement element so that the engagement element 113 of the coupling element 110 may snap in the engagement element of the optical connector 20 when the optical connector 20 is completely inserted into the hollow body of the coupling element 110 such that the ferrule 21 of the optical connector 20 intrudes into the passageway 111 at the side S110a of the coupling element. For cleaning the end face of the ferrule 21, it is possible to disassemble the optical connector 110 and the coupling element 110 by dismantling the engagement element 113 of the coupling element from the complementarily-shaped engagement element of the optical connector 20.

Figure 9A:
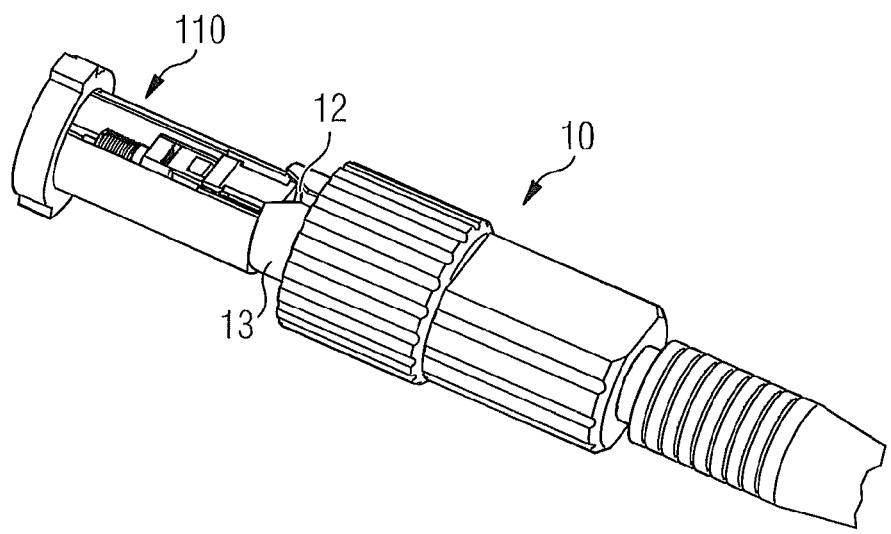
FIG. 9A shows an optical connector optically coupled to an optical connector mounted in a coupling element of an optical adaptor.
Figure 9B:
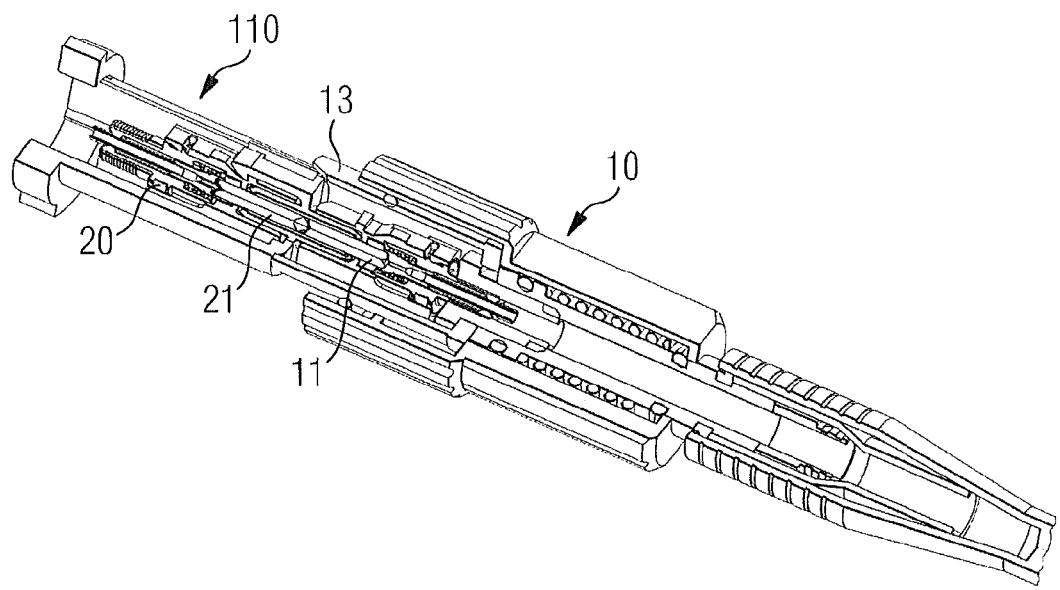
FIG. 9B shows a perspective sectional view of optical connectors coupled by a coupling element of an optical adaptor.

FIG. 9A shows the coupling element 110 with the optical connector 20 inserted in the coupling element 110. The ferrule 21 of the optical connector 20 intrudes in the passageway 111 of the coupling element 110. The coupling element 110 is fitted to the optical connector 10 which is installed on the optical cable 1. FIG. 9B shows a perspective sectional view of the optical connector 10 installed on the optical cable 1 and optically coupled to the coupling element 110. In the coupled state of the optical connector 10 and the coupling element 110 the ferrule 11 of the optical connector 10 intrudes in the passageway 111 of the coupling element 110. The ferrule 11 of the optical connector 10 and the ferrule 21 of the optical connector 20 intrude in the passageway 111 of the coupling element 110 from opposite sides. The faces of the ferrules 11, 21 abut to each other within the passageway 111 so that the optical cables 1 and 2 are optically coupled together.

Figure 10A:
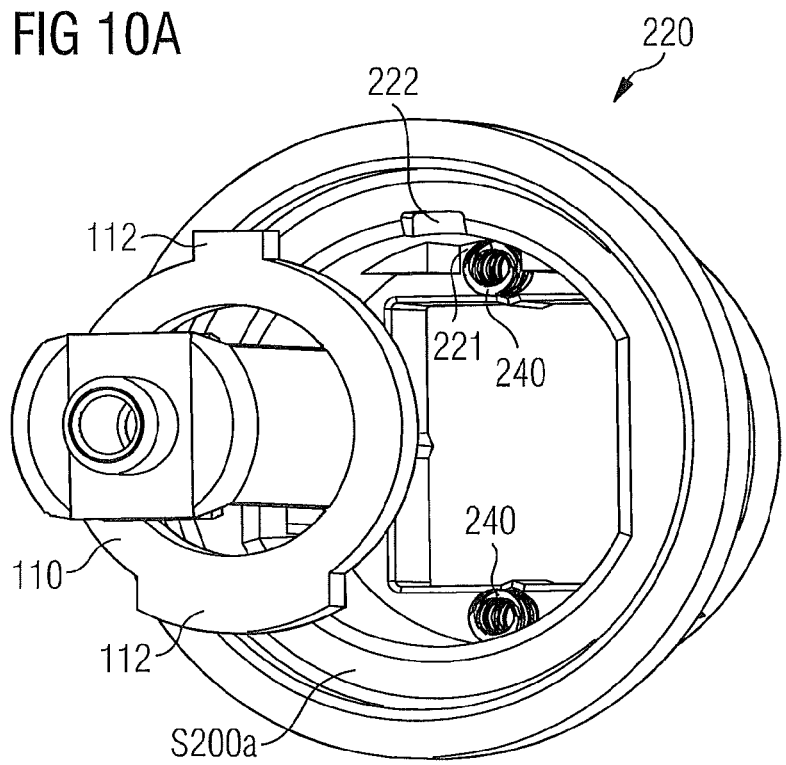
FIG. 10A shows a perspective view of a fixture of a receptacle and a coupling element of an optical adaptor in an unmated configuration.
Figure 10B:
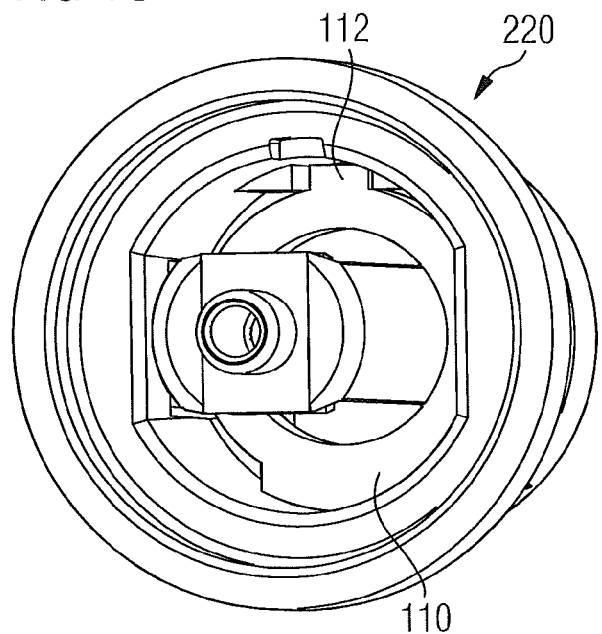
FIG. 10B shows a perspective view of a fixture of a receptacle and a coupling element of an optical adaptor in an assembled configuration.

FIG. 10A illustrates the coupling element 110 of the optical adaptor and the fixture 220 of the receptacle in an unmated configuration. FIG. 10B shows the coupling element 110 being inserted in the hollow body of the fixture 220. The fixture 220 comprises an alignment element 221 being formed in a complementary shape related to the alignment element 112 of the coupling element 110. The alignment element 221 may be formed as a cavity in the inner surface of the fixture 220. The coupling element 110 may comprise two alignment elements 112 being configured as protrusions arranged in a ring-shaped stay of the coupling element at the side S110b of the coupling element. The protrusions 112 may have a different shape so that the coupling element 110 can be inserted in the receptacle 200 only in one predefined direction, if the fixture 220 is provided with the appropriate alignment element 221 in which the alignment element 112 engages when inserting the coupling element 120 in the fixture 220.

The coding 112 of the coupling element 110 and the coding 221 arranged inside the fixture 220 enable that the coupling element 110 can only be mounted in one position to the fixture 220. The mutual coding allows the insertion of the coupling element 110 into the fixture 220 and inhibiting any excess rotation of the coupling element 110 after being inserted in the fixture 220. The fixture 220 further comprises an alignment element 222 to direct the insertion of the fixation adaptor 230 to the fixture 220.

The receptacle 200 further comprises a spring element 240 being configured to push against the coupling element 110, when the coupling element is inserted in the fixture 220. According to a possible embodiment of the optical adaptor 100 a surface of the alignment element 112 may be used as a contact surface to support the spring element 240. The coupling element 110 is inserted from a side S200a of the receptacle 200 into the hollow body of the fixture 220 such that the spring element 240 is pressed against the contact surface of the alignment element 112 of the coupling element 110.

Figure 11A:
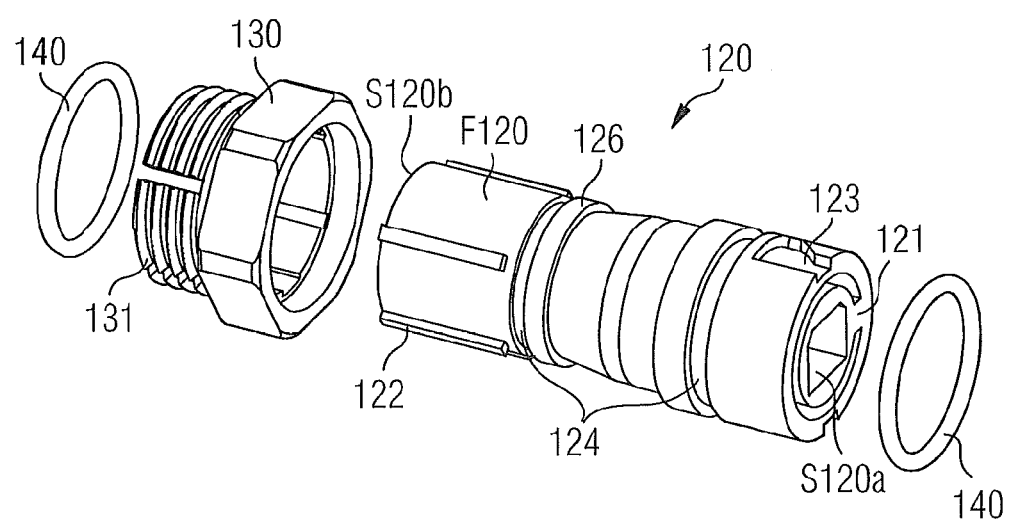
FIG. 11A shows a perspective view of a mounting element, a fixing element and a sealing element of an optical adaptor in an unmated configuration.

FIG. 11A shows a perspective view of the mounting element 120, the fixing element 130 and the sealing element 140 in an unmated configuration. The hollow body of the mounting element 120 has a side S120a with an opening to receive the optical connector 10 and a side S120b to receive the coupling element 110, when the mounting element 120 is inserted into the receptacle 200 in which the coupling element 110 has been previously arranged.

The mounting element 120 comprises an alignment element 121 extending from the opening at the side S120a of the mounting element 120 into the hollow body of the mounting element 120. The alignment element 121 of the mounting element 120 is configured to engage in an alignment element 12 of the optical connector 10 to direct the insertion of the optical connector 10 to the mounting element 120. The alignment element 12 is shown in FIG. 9A and may be formed as one or more slits or cavities in the shroud 13 of the optical connector 10 as desired. The alignment element 121 of the mounting element may be configured as a stay in the interior of the hollow body of the mounting element which intrudes in the slit 12 of the shroud 13 of the optical connector 10, when the optical connector 10 is mounted to the mounting element 120. The engagement of the alignment element 121 of the mounting element 120 and the alignment element 12 of the optical connector 10 ensures that the optical connector 10 can only be coupled in a predefined direction to the mounting element 120 and thus to the optical adaptor 100.

The mounting element 120 further comprises an alignment element 122 disposed on an outer surface F120 of the mounting element. The alignment element 122 is configured to direct the insertion of the mounting element 120 to the receptacle 200. The alignment element 122 may be formed as a nose/lip projecting out of the outer surface F120 of the mounting element 120.

The mounting element 120 further comprises a securing member 123 being configured to mechanically couple the optical connector 10 to the mounting element 120. The securing member 123 may be formed as a bayonet locking mechanism to mechanically couple the optical connector 10 to the mounting element 120. The optical connector 10 may comprise an engagement member having a complementary shape in relation to the securing member 123 so that the engagement member of the optical connector 10 may engage in the securing member 123 of the mounting element 120, when the optical connector 10 is coupled to the mounting element 120. The securing member 123 may also comprise other structures to perform a secure mounting of the mounting element 120 with regard to the optical connector 10. The mounting element 120 may comprise a thread or a snap hook disposed within its surface F120 in lieu of a bayonet locking mechanism. In this case, the optical connector 10 comprises the complementary element such as a thread and a protrusion to receive the snap hook, respectively.

The optical adaptor 100 may comprise at least one sealing element 140 to provide a sealing between the mounting element 120 and the receptacle 200. The mounting element 120 may comprise at least one notch 124 to dispose the sealing element 140. As shown in FIG. 11A, the optical adaptor 100 may comprise two sealing elements 140 which may be configured as O-rings. According to the embodiment of the mounting element shown in FIG. 11A, one of the notches 124 may be arranged in the surface F120 next to the alignment element 122 and another notch 124 may be arranged next to the securing member 123.

The fixing element 130 may comprise a hollow screw to fix the mounting element 120 to the receptacle 200. The mounting element 120 and the hollow screw 130 are configured such that the hollow screw 130 is slidable on the mounting element 120 only from the side S120b of the mounting element, as shown by the arrow in FIG. 11A, and is rotatable on the outer surface F120 of the mounting element 120. The screw 130 is designed to fit to the alignment element 122 disposed on the outer surface of the mounting element 120. When the screw is slid on the outer surface F120 of the mounting element, the screw is arranged between the notches 124 for the sealing elements 140. The outer surface F120 may be formed with a fixing edge 126 which is used as a stopper for the screw 130.

Figure 11B:
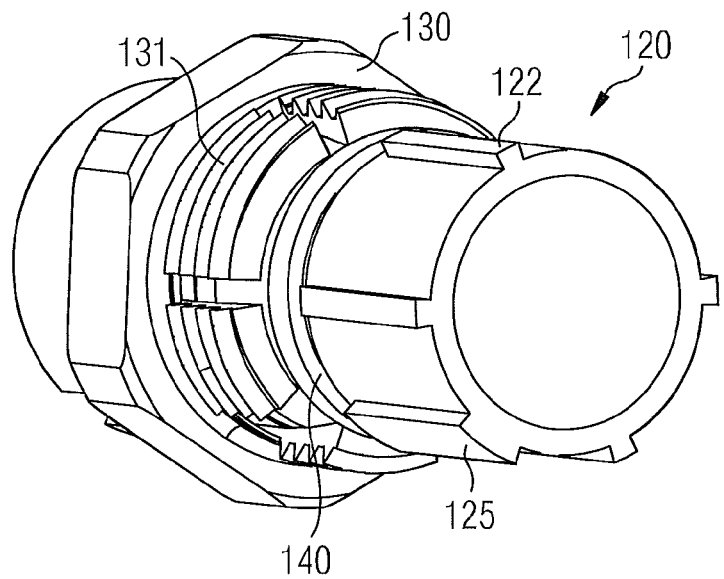
FIG. 11B shows a mounting element, a fixing element and a sealing element of an optical adaptor in a mated configuration.

FIG. 11B shows the mounting element 120, the fixing element 130 and the sealing element 140 in an assembled configuration. The fixing element embodied as the screw 130 is arranged rotatably on the outer surface F120 of the mounting element at a middle portion of the mounting element 120.

Figure 12:
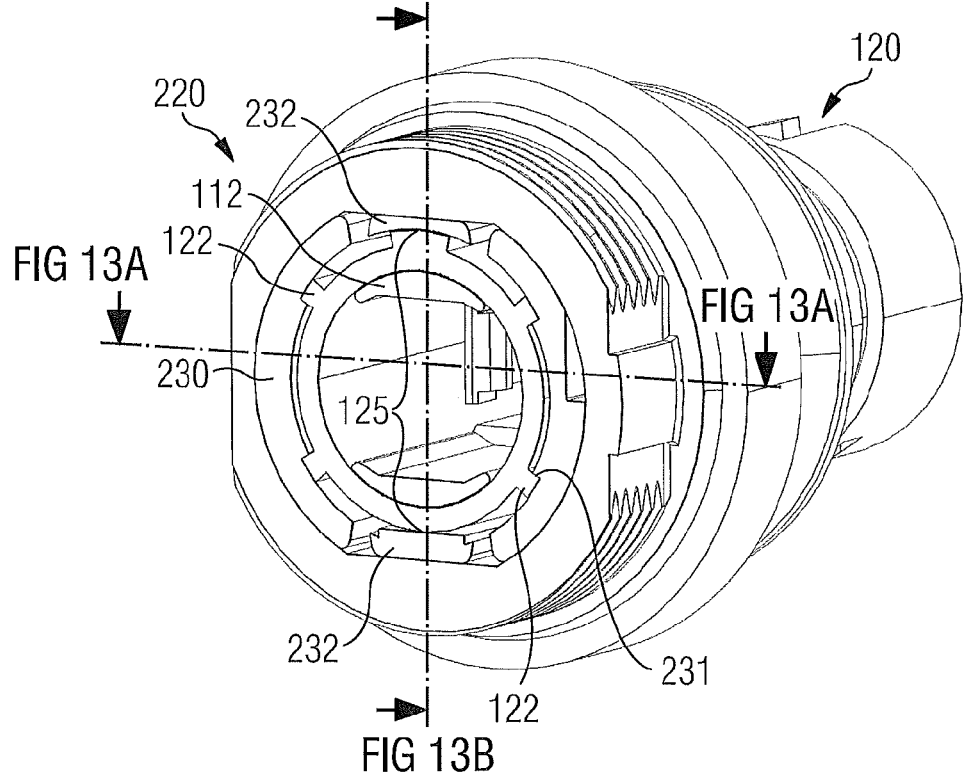
FIG. 12 shows a perspective view of a mounting element of an optical adaptor and a receptacle in an assembled configuration.

FIG. 12 shows the mounting element 120 being inserted in the receptacle 200 comprising the fixture 220 and the fixation adaptor 230. The fixation adaptor 230 comprises alignment element 231 being formed with a complementary shape related to the alignment element 122 of the mounting element 120 to direct the insertion of the mounting element 120 into the fixation adaptor 230. The alignment element 122 is configured to engage in the alignment element 231 of the fixation adaptor 230, when the mounting element 120 is inserted in the fixation adaptor 230 in the predefined orientation. The alignment element 122 of the mounting element and the complementarily-shaped alignment element 231 of the fixation adaptor 230 ensure that the insertion of the mounting element 120 into the fixation adaptor 230 is only possible in one orientation and that a rotation of the mounting element 120 inside the fixation adaptor 230 is prevented.

The fixation adaptor 230 comprises at least a fixing element 232 which may be formed as a snap hook to fix the fixation adaptor 230 to the fixture 220. The mounting element 120 may comprise an abutment element 125 arranged on the outer surface F120 of the mounting element 120. The abutment element 125 may be formed as a protrusion arranged on the outer surface of the mounting element, as illustrated in FIG. 11B. The abutment element 125 is configured to engage the at least one snap hook 232 to the fixture 220 to fix the fixation adaptor 230 to the fixture 220 when inserting the mounting element 120 in the fixation adaptor 230 which is inserted in the fixture 220. The abutment element 125 enables that the snap hook 232 is locked in an engagement area of the fixture 220.

Figure 13A:
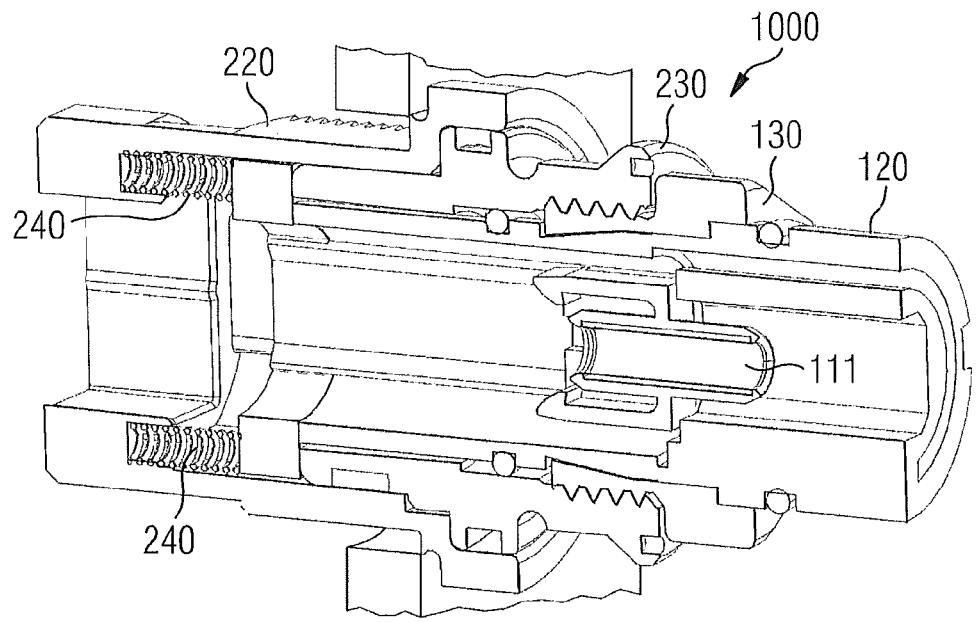
FIG. 13A shows a cross-sectional view of an optical adaptor and a receptacle along a first plane.
Figure 13B:
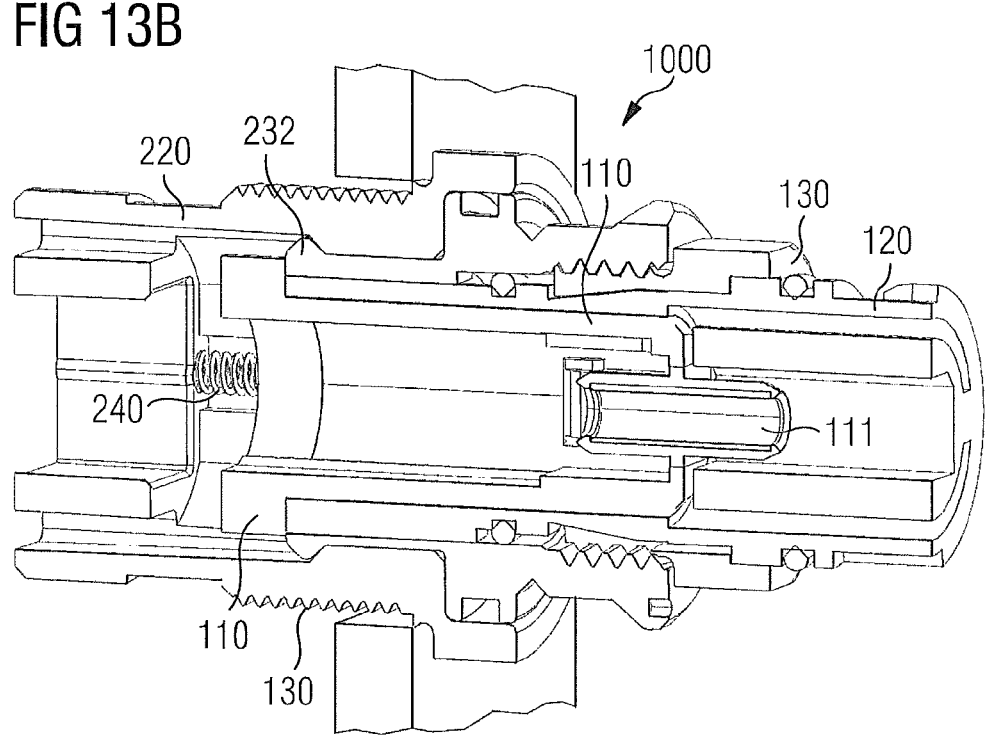
FIG. 13B shows a cross-sectional view of an optical adaptor and a receptacle to optically couple connectorized optical cables along a second plane.

FIG. 13A shows a cross-sectional view of the optical assembly 1000 from a first direction, and FIG. 13B shows the cross-sectional view of the optical assembly 1000 from a second direction. FIGS. 13A and 13B show the hollow body of the coupling element 110 to insert the optical connector 20. The passageway 111 is formed as a tube extending from the side S110 of the coupling element 110 in the hollow body of the coupling element and further extending from the side S110a of the coupling element into the hollow body of the mounting element 120. As shown in FIGS. 13A and 13B, the spring element 240 of the receptacle 200 is configured to push the coupling element 110 of the optical adaptor against the fixation adaptor 230 and the mounting element 120, when the fixation adaptor 230 is fixed to the fixture 220 and the mounting element 120 is inserted in the fixture 220.

FIG. 13B further shows the hollow screw 130 being configured to be screwed to the fixation adaptor 230 to fix the mounting element 120 to the fixture 220. As illustrated in FIG. 11A, the hollow screw 130 may comprise flexible sections 131 being configured to be pressed to the outer surface F120 of the mounting element 120, when the mounting element 120 is fixed to the fixation adaptor 230 by screwing the screw 130 to the inner thread of the fixation adaptor 230.

The sections 131 of the screw 130 are flexible and able to reduce its inner diameter by exerting a pressure from the outside. This pressure is applied during screwing of the screw 130 into the fixation adaptor 230. In the mounted condition of the screw 130 to the fixation adaptor 230, the flexible sections 131 of the screw 130 press against the outer surface F120 of the mounting element in an axial direction. The separated thread elements allow to bend and reduce their inner diameter such that the inner diameter gets smaller than the fixing edge 126 of the mounting element 120. According to another embodiment, not shown, the screw may be split in two halves.

Figure 14A:
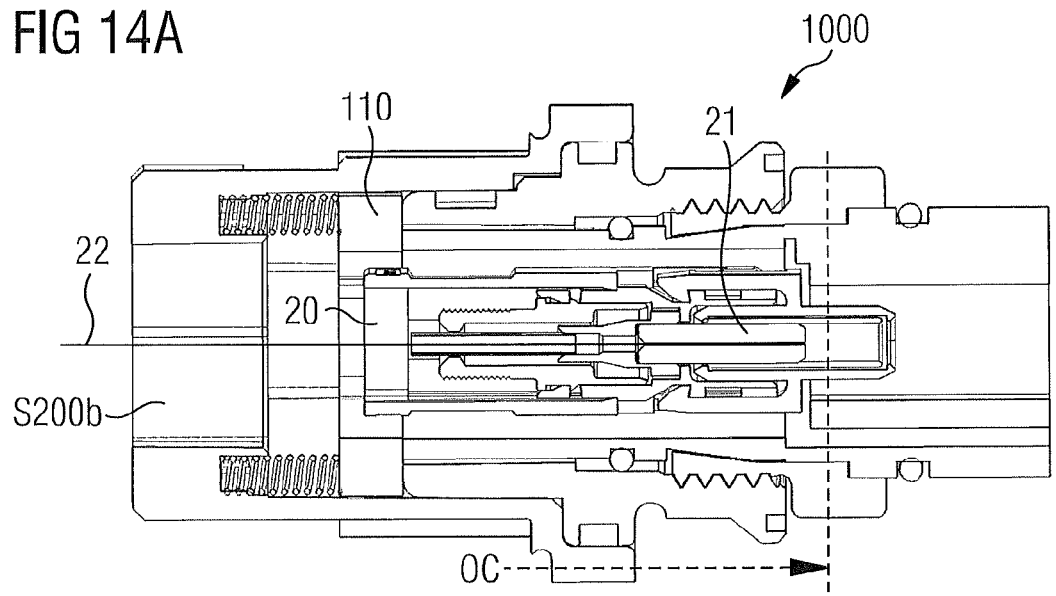
FIG. 14A shows a cross-sectional view of an optical connector mechanically coupled to an optical adaptor mounted to a receptacle.

FIG. 14A illustrates a cross-sectional view of the optical assembly 1000, wherein the optical connector 20 is inserted and engaged to the coupling element 110 of the optical adaptor 100. In the assembled configuration, the ferrule 21 of the optical connector 20 encapsulating the optical fiber 22 of the optical cable 2 intrudes in the passageway 111 of the coupling element 110. The dashed line OC shows the area, where the ferrule 21 of the optical connector 20 abuts against the ferrule 11 of the optical connector 10, when the optical connector 10 is mechanically coupled to the optical assembly 1000 at the side S120a of the mounting element 120. The ferrule is inserted into a sleeve having at least one notch to achieve precise alignment.

The dashed line OC represents the plane in which optical coupling between the ferrules connected to respective to-be-connected optical fibers takes place. The inner surface and the inner structure of the mounting element 120 must be adapted to the optical connector 10 to be inserted into the mounting element 120. The inner structure of the mounting element 120 must be adapted to the outer surface of the optical connector 10 be received, including its ferrule 11 comprised in the optical connector 10. Specifically, the diameter of the cavity of the mounting element 120 must be adapted to the diameter of the to-be-received connector 10. In order to provide sufficient space in the cavity provided by mounting element 120, depending on the type and shape of the connector to be received, the plane represented by line OC may move closer to the left end of the receptacle at the side S200b of the receptacle 200.

Figure 14B:
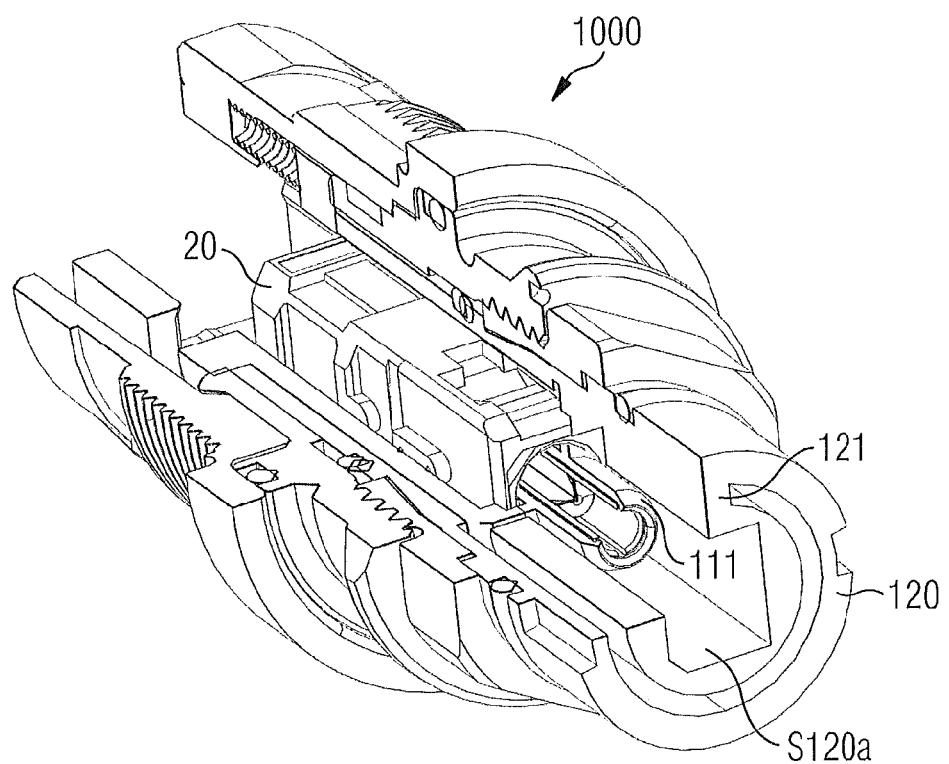
FIG. 14B shows a perspective cross-sectional view of an optical connector mechanically coupled to an optical adaptor mounted to a receptacle.

FIG. 14B shows a perspective sectional view of the optical assembly 1000, wherein the optical connector 20 is inserted in the coupling element 110. As shown in FIG. 14B, the mounting element 120 may be formed with an inner tube extending at the side S120a inside of the hollow body of the mounting element such that a small gap/channel for inserting the shroud 13 of the optical connector 10 is formed between the outer wall of the mounting element and the inner tube. The alignment element 121 may be formed as a stay located in the gap/channel between the outer wall of the mounting element 120 and the inner tube.

FIG. 15 shows a cross-sectional view of the optical assembly 1000 to optically couple connectorized optical cables 1 and 2. The abutment element of the mounting element provides a locking of the at least one snap hook 232 of the fixation adaptor to fix the fixation adaptor 230 to the fixture 220. The compressed screw elements 131 are bent towards the outer surface F120 of the mounting element and fix the optical adaptor against pull-out of the receptacle 200.

FIG. 15 shows the optical connector 10 mechanically coupled to the mounting element 120 and the optical connector 20 inserted in and engaged to the coupling element 110. As shown in FIG. 15, the mounting element 120 is configured to mechanically couple the optical connector 10 to the mounting element 120 so that the ferrule 11 of the optical connector 10 intrudes in the passageway 111 of the coupling element 110. The optical connector 20 is mechanically coupled to the coupling element 110 such that the ferrule 21 of the optical connector 20 intrudes in the passageway 111 of the coupling element 110 and abuts the ferrule 11 of the optical connector 10 to optically couple the optical cables 1 and 2.

The invention claimed is:

1. An optical adaptor for mounting to a receptacle to optically couple connectorized optical cables, the optical adaptor comprising:
a coupling element to provide a passageway for inserting a ferrule of a first optical connector terminating a first one of the connectorized optical cables and a ferrule of a second optical connector terminating a second one of the connectorized optical cables to optically couple the first and the second connectorized optical cables, the coupling element being configured to be insertable in the receptacle and comprising:
a first side; and
a second side positioned opposite the first side to insert the second optical connector into the coupling element to mechanically couple the second optical connector to the coupling element such that the ferrule of the second optical connector intrudes in the passageway;
a mounting element to mount the first optical connector to the receptacle, the mounting element being configured to be insertable in the receptacle and wherein:
the mounting element is formed as a hollow body to receive the coupling element to fix the coupling element to the receptacle when the coupling element is inserted in the receptacle and the mounting element is fixed to the receptacle;
the mounting element is configured to mechanically couple the first optical connector to the mounting element so that the ferrule of the first optical connector intrudes in the passageway of the coupling element at the first side of the coupling element; and
the mounting element comprises a fixing edge positioned on an outer surface of the mounting element, the fixing edge having an outer diameter;
the outer surface of the mounting element defines a taper positioned adjacent to the fixing edge and wherein an outer diameter of the mounting element changes moving along the taper in an axial direction away from the fixing edge; and
a fixing element to fix the mounting element to the receptacle, the fixing element comprising a hollow screw, wherein the hollow screw is slideable on the mounting element and is rotatable on the mounting element, the hollow screw comprising flexible sections being configured to be pressed to the mounting element when the optical adaptor is mounted to the receptacle, and wherein the flexible sections of the fixing element are repositionable to reduce an inner diameter of the fixing element to be less than the outer diameter of the fixing edge of the mounting element when the optical adaptor is mounted to the receptacle.

2. The optical adaptor as claimed in claim 1, wherein the hollow body of the mounting element has a first side with an opening to receive the first optical connector in the hollow body and a second side to receive the coupling element, and wherein the mounting element comprises a first alignment element extending from the opening at the first side of the mounting element into the hollow body of the mounting element,
wherein the first alignment element of the mounting element is configured to engage in an alignment element of the first optical connector to direct the insertion of the first optical connector to the mounting element.

3. The optical adaptor of claim 2, wherein the mounting element comprises a second alignment element disposed on an outer surface of the mounting element, and wherein the second alignment element is configured to direct the insertion of the mounting element to the receptacle.

4. The optical adaptor of claim 2, wherein the coupling element comprises a hollow body to insert the second optical connector, and wherein the passageway is formed as tube extending from the first side of the coupling element in the hollow body of the coupling element and extending from the first side of the coupling element into the hollow body of the mounting element, when the mounting element fixes the coupling element to the receptacle.

5. The optical adaptor of claim 1, wherein the mounting element comprises a securing member being configured to mechanically couple the first optical connector to the mounting element.

6. The optical adaptor of claim 1, comprising:
a sealing element to provide a sealing between the mounting element and the receptacle, wherein the mounting element comprises at least one notch to dispose the sealing element.

7. The optical adaptor of claim 1, wherein the coupling element comprises an alignment element to direct the insertion of the coupling element into the receptacle.

8. The optical adaptor of claim 1, wherein the coupling element comprises an engagement element to engage the second optical connector to the coupling element.

9. An optical assembly to optically couple connectorized optical cables, comprising: an optical adaptor for mounting to a receptacle to optically couple connectorized optical cables of claim 1, wherein the receptacle comprises a fixture to fix the receptacle in a hole of a housing and to insert the coupling element of the optical adaptor, and wherein the receptacle comprises a fixation adaptor being configured to be inserted into the fixture and being formed as a hollow body to insert the mounting element and to fix the fixing element of the optical adaptor.

10. The optical assembly of claim 9, wherein the fixture comprises an alignment element being formed with a complementary shape related to an alignment element of the coupling element of the optical adaptor to direct the insertion of the coupling element into the fixture, and wherein the fixation adaptor comprises an alignment element being formed with a complementary shape related to a second alignment element of the mounting element of the optical adaptor to direct the insertion of the mounting element into the fixation adaptor.

11. The optical assembly of claim 9, wherein the receptacle comprises a spring element being configured to push the coupling element of the optical adaptor against the fixation adaptor and the mounting element of the optical adaptor, when the fixation adaptor and the mounting element are fixed to the fixture.

12. The optical assembly of claim 9, wherein the hollow screw of the fixing element is configured to be screwed to the fixation adapter to fix the mounting element of the optical adaptor to the fixture.

13. The optical assembly of claim 9, wherein the fixation adapter comprises at least one snap hook to fix the fixation adapter to the fixture, and wherein the mounting element of the optical adaptor comprises an abutment element arranged on the outer surface of the mounting element and being configured to engage the at least one snap hook to the fixture to fix the fixation adapter to the fixture, when inserting the mounting element in the fixation adapter being inserted in the fixture.

14. An optical adaptor for mounting to a receptacle to optically couple connectorized optical cables, the optical adaptor comprising:
a coupling element to provide a passageway for inserting a ferrule of a first optical connector terminating a first one of the connectorized optical cables and a ferrule of a second optical connector terminating a second one of the connectorized optical cables to optically couple the first and the second connectorized optical cables, the coupling element being configured to be insertable in the receptacle and comprising:
a first side; and
a second side positioned opposite the first side to insert the second optical connector into the coupling element to mechanically couple the second optical connector to the coupling element such that the ferrule of the second optical connector intrudes in the passageway;
a mounting element to mount the first optical connector to the receptacle, the mounting element being configured to be insertable in the receptacle and wherein:
the mounting element is formed as a hollow body to receive the coupling element to fix the coupling element to the receptacle when the coupling element is inserted in the receptacle and the mounting element is fixed to the receptacle;
the mounting element is configured to mechanically couple the first optical connector to the mounting element so that the ferrule of the first optical connector intrudes in the passageway of the coupling element at the first side of the coupling element; and
the mounting element comprises a fixing edge protruding outward from an outer surface of the mounting element, the fixing edge having an outer diameter; and
a fixing element to fix the mounting element to the receptacle, the fixing element comprising a hollow screw, wherein:
the hollow screw is slideable on the mounting element and is rotatable on the mounting element, the hollow screw comprising flexible sections being configured to be pressed to the mounting element when the optical adaptor is mounted to the receptacle;
the flexible sections of the fixing element flex inwardly to reduce an inner diameter of the fixing element to be less than the outer diameter of the fixing edge of the mounting element when the optical adaptor is mounted to the receptacle; and
the flexible sections engage a depressed area of the outer surface of the mounting element in a latched manner.

15. The optical adaptor as claimed in claim 14, wherein the hollow body of the mounting element has a first side with an opening to receive the first optical connector in the hollow body and a second side to receive the coupling element, and wherein the mounting element comprises a first alignment element extending from the opening at the first side of the mounting element into the hollow body of the mounting element,
wherein the first alignment element of the mounting element is configured to engage in an alignment element of the first optical connector to direct the insertion of the first optical connector to the mounting element.

16. The optical adaptor of claim 15, wherein the mounting element comprises a second alignment element disposed on an outer surface of the mounting element, and wherein the second alignment element is configured to direct the insertion of the mounting element to the receptacle.

17. The optical adaptor of claim 14, wherein the mounting element comprises a securing member being configured to mechanically couple the first optical connector to the mounting element.

18. The optical adaptor of claim 14, comprising:
a sealing element to provide a sealing between the mounting element and the receptacle, wherein the mounting element comprises at least one notch to dispose the sealing element.

19. The optical adaptor of claim 14, wherein the coupling element comprises an alignment element to direct the insertion of the coupling element into the receptacle.

20. The optical adaptor of claim 14, wherein the coupling element comprises an engagement element to engage the second optical connector to the coupling element.

* * * * *

UNITED STATES PATENT AND TRADEMARK OFFICE
CERTIFICATE OF CORRECTION

PATENT NO. : 10,317,627 B2
APPLICATION NO. : 15/591687
DATED : June 11, 2019
INVENTOR(S) : Joachim Rudolf Beier et al.

Page 1 of 1

It is certified that error appears in the above-identified patent and that said Letters Patent is hereby corrected as shown below:

On the Title Page

Item (71), Applicant, Line 1, delete "CCS Technology, Inc.," and insert -- CORNING OPTICAL COMMUNICATIONS LLC, Hickory, NC (US) --, therefor.

Signed and Sealed this
First Day of October, 2019

Andrei Iancu
*Director of the United States Patent and Trademark Office*